(12) United States Patent
Bruggeman et al.

(10) Patent No.: US 7,347,136 B2
(45) Date of Patent: Mar. 25, 2008

(54) AIRLESS SPRAYER WITH HARDENED CYLINDER

(75) Inventors: Daniel J. Bruggeman, Minneapolis, MN (US); Stephen C. Kohs, Forest Lake, MN (US)

(73) Assignee: Diversified Dynamics Corporation, Minneapolis, MN (US)

( * ) Notice: Subject to any disclaimer, the term of this patent is extended or adjusted under 35 U.S.C. 154(b) by 47 days.

(21) Appl. No.: 11/297,736

(22) Filed: Dec. 8, 2005

(65) Prior Publication Data

US 2007/0131109 A1 Jun. 14, 2007

(51) Int. Cl.
*B05B 15/00* (2006.01)
*B05B 7/00* (2006.01)

(52) U.S. Cl. .................... 92/169.1; 29/888.06

(58) Field of Classification Search ............... 92/169.1; 29/888.06, 888.061; 417/398
See application file for complete search history.

(56) References Cited

U.S. PATENT DOCUMENTS

| 615,751 | A | 12/1898 | Sands |
|---|---|---|---|
| 1,186,088 | A | 6/1916 | Finlay |
| 1,268,271 | A | 6/1918 | Nelson |
| 1,428,079 | A | 9/1922 | Clark |
| 1,691,024 | A | 11/1928 | Gedge |
| 1,714,350 | A | 5/1929 | De Jong |
| 1,875,574 | A | 9/1932 | Duncan |
| 2,011,635 | A | 8/1935 | Homan |
| 2,082,582 | A | 6/1937 | Kling |
| 2,249,401 | A | 7/1941 | Sleg |
| 2,281,367 | A | 4/1942 | Moll |
| 2,301,586 | A | 11/1942 | Rubin |
| 2,350,469 | A | 6/1944 | Litke |
| 2,443,981 | A | 6/1948 | Funk et al. |
| 2,517,551 | A | 8/1950 | Eckman |
| 2,521,967 | A | 9/1950 | Dean |
| 2,557,214 | A | 6/1951 | Bales |
| 2,564,721 | A | 8/1951 | Raya |
| 2,576,192 | A | 11/1951 | Poznik |

(Continued)

FOREIGN PATENT DOCUMENTS

AU 129491 2/1947

(Continued)

OTHER PUBLICATIONS

Homeright Instructional Packet, "Electric Power-Flo Roller Instructions," (12 pgs.).

(Continued)

*Primary Examiner*—Thomas E. Lazo
(74) *Attorney, Agent, or Firm*—Gerald E. Helget; Nelson R. Capes; Briggs and Morgan, P.A.

(57) ABSTRACT

An airless sprayer for paint or the like consists of an electric drive unit connected to a piston. Driven by the electric drive unit, the piston reciprocates within the cylinder, thus spraying the paint or the like. Because of the close tolerance between the piston and cylinder (typically about 0.0002 to about 0.0003 inches), the sprayed liquid provides a seal between the piston and cylinder. To prevent this tolerance from increasing to the point of failure, the cylinder is manufactured from nitride hardened steel. A process for manufacturing the airless sprayer is also disclosed.

12 Claims, 2 Drawing Sheets

U.S. PATENT DOCUMENTS

| | | |
|---|---|---|
| 2,613,384 A | 10/1952 | Collins |
| 2,632,904 A | 3/1953 | Halecky |
| 2,647,273 A | 8/1953 | Eagle |
| 2,682,071 A | 6/1954 | Linderoth |
| 2,685,702 A | 8/1954 | Jones |
| 2,722,029 A | 11/1955 | Barnes et al. |
| 2,727,268 A | 12/1955 | Hucke |
| 2,805,646 A | 9/1957 | Shlesinger, Jr. |
| 2,825,916 A | 3/1958 | Basala, Jr. |
| 2,856,622 A | 10/1958 | Jacobsen |
| 2,916,755 A | 12/1959 | De Bozzay |
| 2,964,769 A | 12/1960 | Mercereau |
| 2,997,732 A | 8/1961 | Gilchrist et al. |
| 3,000,040 A | 9/1961 | Carlson |
| 3,020,579 A | 2/1962 | O'Connor |
| 3,103,690 A | 9/1963 | Day |
| 3,114,922 A | 12/1963 | Ballantyne |
| 3,148,401 A | 9/1964 | Gilchrist et al. |
| 3,166,775 A | 1/1965 | Cushman |
| 3,170,182 A | 2/1965 | Burian |
| 3,175,242 A | 3/1965 | Kamondy et al. |
| 3,195,170 A | 7/1965 | Howard |
| 3,210,794 A | 10/1965 | Vosbikian |
| 3,231,151 A | 1/1966 | Clark et al. |
| 3,337,899 A | 8/1967 | Rentfrow |
| 3,369,268 A | 2/1968 | Burns et al. |
| 3,418,054 A | 12/1968 | Kirch |
| 3,422,844 A | 1/1969 | Grise |
| 3,455,638 A | 7/1969 | Braswell |
| 3,457,017 A | 7/1969 | Bastian |
| 3,459,482 A | 8/1969 | Fears |
| 3,476,507 A | 11/1969 | Leeds |
| 3,504,699 A | 4/1970 | Grisé |
| 3,554,659 A | 1/1971 | Stokes |
| 3,612,707 A | 10/1971 | Herbrechter |
| 3,623,179 A | 11/1971 | Roth |
| 3,702,739 A | 11/1972 | Rentfrow |
| 3,713,744 A | 1/1973 | Sims |
| 3,734,149 A | 5/1973 | Hansel |
| 3,766,879 A | 10/1973 | Jones |
| 3,774,252 A | 11/1973 | Cantales |
| 3,776,645 A | 12/1973 | Walker |
| 3,783,469 A | 1/1974 | Siemund |
| 3,822,720 A | 7/1974 | Souza |
| 3,837,381 A | 9/1974 | Arroyo |
| 3,837,747 A | 9/1974 | Seymore |
| 3,850,408 A | 11/1974 | Shelnick |
| 4,032,239 A | 6/1977 | Maupin |
| 4,066,366 A | 1/1978 | Reynolds |
| 4,067,414 A | 1/1978 | Funke |
| 4,119,386 A | 10/1978 | Cushing |
| 4,217,062 A | 8/1980 | Trp et al. |
| 4,231,668 A | 11/1980 | Groth et al. |
| 4,291,491 A | 9/1981 | Maddock |
| 4,309,227 A * | 1/1982 | Kajikawa et al. ........... 148/222 |
| 4,312,093 A | 1/1982 | Raab |
| 4,315,342 A | 2/1982 | Ash |
| 4,324,018 A | 4/1982 | Olsson |
| 4,357,779 A | 11/1982 | Maddock |
| 4,434,810 A | 3/1984 | Atkinson |
| 4,436,519 A | 3/1984 | O'Neill |
| 4,442,977 A * | 4/1984 | Beiswenger et al. ........ 239/332 |
| 4,460,415 A * | 7/1984 | Korhonen et al. .......... 148/222 |
| 4,475,262 A | 10/1984 | Downer |
| 4,540,301 A | 9/1985 | Swanson et al. |
| 4,611,941 A | 9/1986 | Karliner et al. |
| 4,639,156 A | 1/1987 | Stern et al. |
| 4,695,176 A | 9/1987 | Simonette et al. |
| 4,732,503 A | 3/1988 | Bader et al. |
| 4,756,481 A * | 7/1988 | Leuenberger ............... 239/332 |
| 4,810,123 A | 3/1989 | Bruggeman |
| 4,822,194 A | 4/1989 | Simonette |
| 4,852,210 A | 8/1989 | Krajicek |
| 4,944,623 A | 7/1990 | McNeil |
| 4,971,471 A | 11/1990 | Sloan |
| 4,997,302 A | 3/1991 | Simonette |
| 5,020,181 A | 6/1991 | Leonard |
| 5,056,717 A * | 10/1991 | Koide ......................... 239/332 |
| 5,165,870 A * | 11/1992 | Sato ......................... 417/410.3 |
| 5,167,055 A | 12/1992 | Stoddart et al. |
| 5,236,129 A | 8/1993 | Grime et al. |
| 5,272,782 A | 12/1993 | Hutt |
| 5,330,108 A | 7/1994 | Grime et al. |
| 5,425,589 A | 6/1995 | Griffin et al. |
| 5,594,971 A | 1/1997 | Nelson |
| 5,613,264 A | 3/1997 | Knowles |
| 5,655,885 A * | 8/1997 | Chung ........................ 92/128 |
| 5,803,367 A | 9/1998 | Heard et al. |
| 6,053,722 A * | 4/2000 | Topolski et al. ............. 425/313 |
| 6,109,811 A | 8/2000 | Song |
| 6,142,693 A | 11/2000 | Bruggeman et al. |
| 6,168,093 B1 * | 1/2001 | Greer et al. ................. 239/332 |
| 6,244,771 B1 | 6/2001 | Bruggeman et al. |
| D444,928 S | 7/2001 | Bruggeman et al. |
| D476,122 S | 6/2003 | Bruggeman et al. |
| 7,159,507 B2 * | 1/2007 | Grollimund et al. .......... 92/31 |
| 2001/0025394 A1 | 10/2001 | Napolitan |
| 2002/0081208 A1* | 6/2002 | Thompson et al. ......... 417/398 |
| 2002/0104587 A1* | 8/2002 | Medeiros et al. ........... 148/215 |

FOREIGN PATENT DOCUMENTS

| | | |
|---|---|---|
| CA | 784908 | 5/1968 |
| EP | 0572236 | 1/1998 |
| GB | 735590 | 8/1955 |
| GB | 868894 | 5/1961 |
| GB | 2094443 | 9/1982 |
| GB | 2148154 | 5/1985 |
| GB | 2155147 | 9/1985 |

OTHER PUBLICATIONS

Wagner Instructional Packet, "The Right Tool for the Right Job," 2001 Wagner Spray Tech., (16 pgs.).

* cited by examiner

AIRLESS SPRAYER WITH HARDENED CYLINDER

BACKGROUND OF THE INVENTION

The present patent application relates to an airless sprayer and in particular to an airless sprayer having a tungsten steel plunger with a nitride-hardened cylinder and/or piston and a process of manufacturing the same.

Airless sprayers are known in the art, for example, the Black and Decker Models Stain, Plus, and Deluxe. These sprayers are able to spray paint without the need for compressed air. They generally operate on the principle of high-speed oscillation of a steel piston within a steel cylinder, the oscillation of the piston in turn being produced by an electric motor. In order for the sprayer to work, there must be a very small clearance, on the order of 0.0002 to 0.0003 inches, between the piston and the cylinder. With this small clearance, there is no need for a seal because the liquid being sprayed creates a seal.

However, certain paints such as acrylic latex, contain silica, a very abrasive material. As this paint is being sprayed, the silica wears down the cylinder. When the clearance between the piston and cylinder reaches approximately 0.002 inches, the sprayer will cease working. This typically occurs after spraying approximately 25 gallons of acrylic latex paint. At this point, the cylinder must be replaced.

The present invention involves treating the cylinder with a nitride process that greatly hardens the cylinder. Applicant has found that this hardening approximately doubles or triples the life the cylinder.

Nitriding is a process that is known for hardening various metals such as cast iron, steel, stainless steel, some nickel-based alloys, and titanium. A typical process is the Ultraglow® process from Advanced Heat Treat Corp., 2825 Midport Blvd., Waterloo, IA 50703. This technology is used in industry to improve material properties and extend tool life. Some improvements include: reduced coefficient of friction, improved wear resistance, and increased fatigue life. These improvements can be achieved without making any changes to the core properties, resulting in comparatively high part ductility and impact strength. Nonessential subject matter indicating the state of the art is hereby incorporated by reference ("Design Considerations for Iron Nitriding" published by Advanced Heat Treat Corp.). Other typical processes that could be used are the Tougbnite Gas Soft Nitriding Process from Hightemp Furnaces, Limited, IC, $2^{nd}$ Phase, Peenya Industrial Area, P.O. Box No. 5809, Bangalore—560 058 India; and the gas soft nitriding process from Trutec Industries.

The characteristics of plasma nitriding are established through the type and thickness of the compound zone, the surface hardness, and the nitriding-hardness depth (diffusion zone thickness). These qualities are contingent upon alloy content, microstructure condition, tensile strength, and the hardness of the material before the plasma nitriding treatment.

Specifications developed by Advanced Heat Treat Corp. (AHT) determine the process parameters to be used, depending on the type of metal and the desired case depth of the finished product. These parameters are proprietary to AHT and do not form part of this patent application. However, the structure of the nitrided cylinder does form part of the present application, as well as the method of manufacture using the nitriding process.

SUMMARY OF THE INVENTION

An airless sprayer for paint or the like consists of an electric drive unit connected to a piston. Driven by the electric drive unit, the piston reciprocates within the cylinder, thus spraying the paint or the like. Because of the close tolerance between the piston and cylinder (typically about 0.0002 to about 0.0003 inches), the sprayed liquid provides a seal between the piston and cylinder. To prevent this tolerance from increasing to the point of failure, the cylinder and/or piston is manufactured from nitride hardened steel. A process for manufacturing the airless sprayer is also disclosed.

A principal object and advantage of the present invention is that the nitride-hardened steel of the cylinder results in about twice to three times the life of the piston and cylinder when spraying acrylic latex paint.

Another principal object and advantage of the present invention is that the cost of the nitriding process is considerably less than the unit cost of the cylinder, thus making the nitriding process more economically feasible than replacing the cylinder.

DETAILED DESCRIPTION OF THE PREFERRED EMBODIMENT

Figure 1:
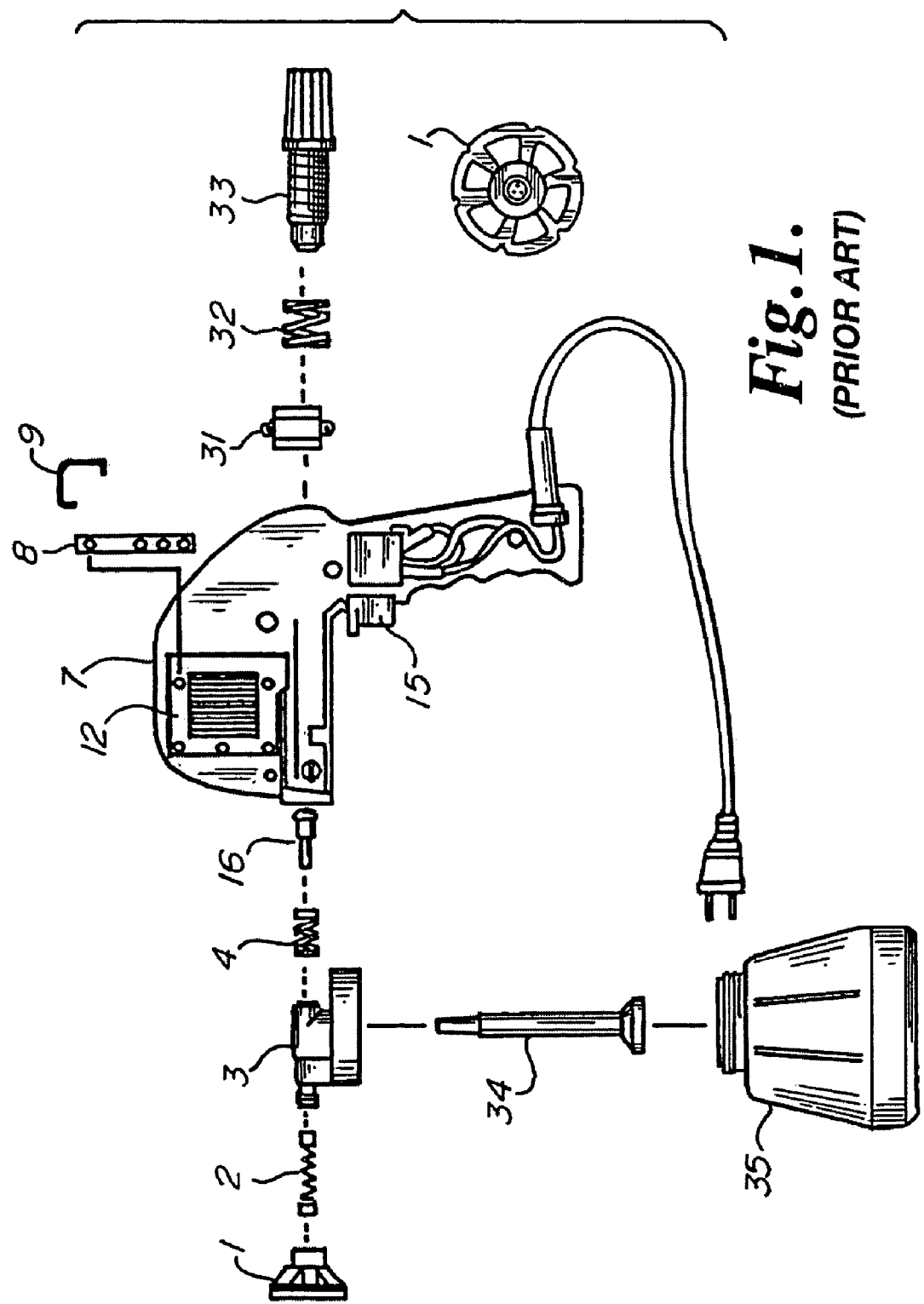
FIG. 1 is a schematic of the parts of the airless sprayer of the prior art.

In one aspect, the present invention is an airless sprayer 10, comprising an electric drive unit 12, a cylinder 14, and piston 16, the piston 16 reciprocating within the cylinder 14 and being driven by the electric drive unit 12. The clearance between the piston 16 and the cylinder 14 is such that the fluid sprayed material, typically paint, creates a seal between the piston 16 and the cylinder 14. This self-sealing action fails, however, when the clearance between the piston 16 and the cylinder 14 reaches about 0.002 inches. The starting clearance between the piston 16 and cylinder 14 is about 0.0002 to about 0.0003 inches. Because latex acrylic paint contains silica, which is highly abrasive, the clearance increases to the limit of about 0.002 inches after spraying about 25 gallons of such paint. At this point, the cylinder must be replaced.

However, by hardening the steel of the cylinder 14, it is possible to achieve twice to three times the life of the piston and cylinder. Because the non-hardened cylinder has a cost of about $6.00 and the hardening process costs about $1.00 per cylinder, it is clearly more economical to harden the cylinder than to replace it.

Therefore, the airless sprayer 10 further comprises nitride hardened steel 18 in the cylinder 14. In addition, the steel of the piston 16 may also be nitride hardened.

Preferably, the nitride hardened steel of the cylinder 14 will have a case depth 19 of about 0.002 inches to about 0.005 inches.

Figure 3A:
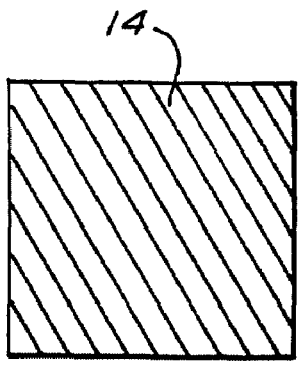
FIG. 3A is a schematic cross-section of a non- nitride hardened cylinder of the prior art.
Figure 3B:
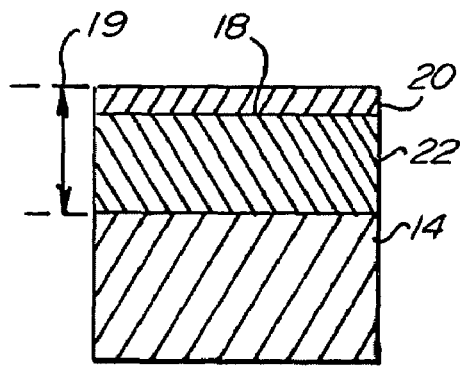
FIG. 3B is a schematic cross-section of a ion nitride hardened cylinder of the present invention.

FIG. 3A is a schematic cross-section of the cylinder 14 before nitride hardening. FIG. 3B shows a plasma/nitrided surface 18 on the cylinder 14 consisting of a compound zone 20 and an underlying diffusion zone 22. The outer, very thin layer consists of an inter-metallic compound of iron and nitrogen, often called the white layer. In the underlying diffusion zone, the nitrogen is precipitated in the form of very small nitrides. Preferably, the depth of the compound zone is about 0.0001 inches to about 0.0002 inches.

Most preferably the steel of the cylinder 14 before nitride-hardening comprises type H-13 hot work tool steel.

Figure 2:
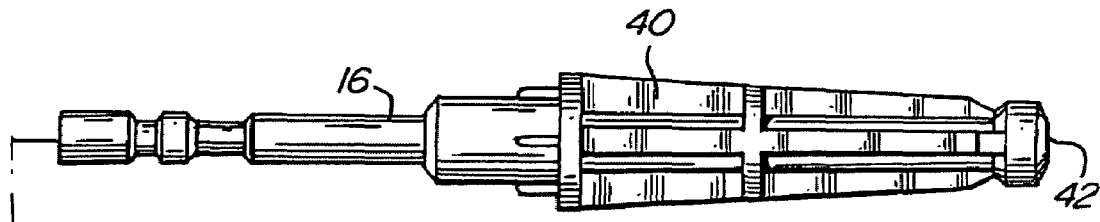
FIG. 2 is an exploded schematic of the piston and cylinder of the present invention.
Figure 2A:
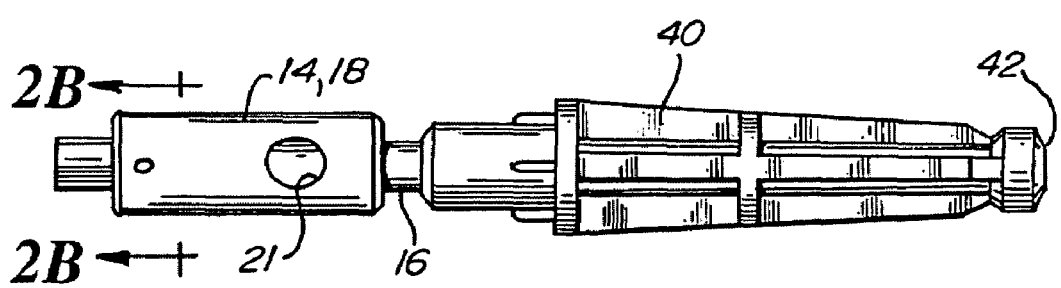
FIG. 2A is a schematic of the piston and cylinder of the present invention.
Figure 2B:
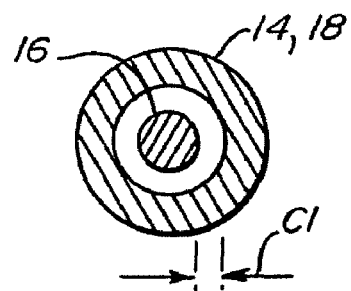
FIG. 2B is a cross-section taken at approximately the lines 2B of FIG. 2A.

As shown in FIG. 1, other operating parts of the airless sprayer include a spray tip 1, atomizer valve 2, cylinder housing 3, piston spring 4, tool housing 7, armature 8, plate spring 9, volume control nut 31, spring 32, volume control knob 33, pickup tube 34, container 35, and switch 15. The electric drive unit 12 connects to the piston 16 via a shaft 40 having a knob 42, which is gripped by the electric drive unit (see FIG. 2A). As the electric drive unit 12 oscillates the piston 16, paint is sucked into the cylinder housing 3 from the container 35 through the pickup tube 34. Paint is sprayed by the atomizer valve 2 through the spray tip 1. The volume of paint sprayed can be adjusted by turning the volume control knob 33.

In a second aspect, the present invention comprises a process for manufacturing an airless sprayer, comprising the steps of nitride hardening a cylinder 14; inserting a piston 16 into the cylinder 14; and connecting the piston 16 to an electric drive unit 12 for reciprocating action within the cylinder 14.

The resulting airless sprayer 10 has a cylinder 14 that has approximately twice to three times the resistance to abrasive wear due to acrylic latex paint as a sprayer with non-ion nitride hardened steel in the cylinder 14.

Preferably, the nitride hardened steel of the cylinder 14 will have a case depth 19 of about 0.002 inches to about 0.005 inches.

As an additional step, the steel of the piston 16 may also be nitride hardened.

FIG. 3A is a schematic cross-section of the cylinder 14 before nitride hardening. FIG. 3B is a schematic cross-section of the nitride hardened part, typically the cylinder 14. The hardened steel 18 comprises a compound zone 20 and a diffusion zone 22. Preferably, the depth of the compound zone is about 0.0001 inches to about 0.0002 inches.

Most preferably the steel of the cylinder 14 before nitride-hardening comprises type H-13 hot work tool steel.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described below. All publications, patent applications, patents, and other references mentioned herein are incorporated by reference in their entirety to the extent allowed by applicable law and regulations. In case of conflict, the present specification, including definitions, will control.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. An airless sprayer, comprising:
   a. an electric drive unit;
   b. a cylinder; and
   c. a piston reciprocating within the cylinder, the piston reciprocatingly driven by the electric drive unit,
   d. wherein the cylinder further comprises nitride-hardened steel,
   e. wherein the clearance between the piston and the cylinder is about 0.0002 inches to about 0.0003 inches.

2. The airless sprayer of claim 1, wherein the nitride-hardened steel of the cylinder has approximately twice to three times the resistance to abrasive wear due to acrylic latex paint of non-nitride-hardened steel.

3. The airless sprayer of claim 1, wherein the nitride hardened steel of the cylinder has a finished case depth of about 0.002 inches to about 0.005 inches.

4. The airless sprayer of claim 1, the nitride-hardened steel of the cylinder comprising a compound zone and an underlying diffusion zone, wherein the depth of the compound zone in the ion nitride-hardened steel of the cylinder is about 0.0001 inches to about 0.0002 inches.

5. The airless sprayer of claim 1, wherein the steel of the cylinder before nitride-hardening comprises type H-13 hot work tool steel.

6. The airless sprayer of claim 1, wherein the piston further comprises nitride-hardening steel.

7. A process for manufacturing an airless sprayer, comprising the steps of:
   a. nitride hardening a cylinder;
   b. inserting a piston into the cylinder wherein the clearance between the piston and the cylinder is about 0.0002 inches to about 0.0003 inches; and
   c. connecting the piston to an electric drive unit for reciprocating action within the cylinder.

8. The process of claim 7, wherein the nitride-hardened steel of the cylinder has approximately twice to three times the resistance to abrasive wear due to acrylic latex paint of non-ion nitride-hardened steel.

9. The process of claim 7, wherein the nitride hardened steel of the cylinder has a finished case depth of about 0.002 inches to about 0.005 inches.

10. The process of claim 7, the nitride-hardened steel of the cylinder comprising a compound zone and an underlying diffusion zone, wherein the depth of the compound zone in the ion nitride-hardened steel of the cylinder is about 0.0001 inches to about 0.0002 inches.

11. The process of claim 7, wherein the steel of the cylinder before nitride-hardening comprises type H-13 hot work tool steel.

12. The process of claim 7, further comprising the step of nitride hardening the piston.

* * * * *